US011997357B2

(12) United States Patent
Bergot et al.

(10) Patent No.: US 11,997,357 B2
(45) Date of Patent: May 28, 2024

(54) DEVICE AND METHOD FOR NAVIGATION THROUGH ACTIVE ELEMENTS IN A DISPLAYED PAGE (71) Applicant: INTERDIGITAL MADISON PATENT HOLDINGS, SAS, Paris (FR)

(72) Inventors: Sebastien Bergot, Mouaze (FR); Sebastien Fraleu, Noyal sur Vilaine (FR); Goulven Querre, Noyal sur Vilaine (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/370,982

(22) Filed: Mar. 30, 2019

(65) Prior Publication Data
US 2019/0306579 A1    Oct. 3, 2019

(30) Foreign Application Priority Data

Mar. 30, 2018   (EP) .................................. 18305378

(51) Int. Cl.
*H04N 21/4722*   (2011.01)
*G06F 3/04817*   (2022.01)
(Continued)

(52) U.S. Cl.
CPC ..... *H04N 21/4722* (2013.01); *G06F 3/04817* (2013.01); *G06F 3/0482* (2013.01);
(Continued)

(58) Field of Classification Search
CPC ............. H04N 21/4821; H04N 21/482; H04N 5/44543; H04N 21/47214; H04N 21/812;
(Continued)

(56) References Cited

U.S. PATENT DOCUMENTS 5,446,505 A * 8/1995 Chang Soo ............ G04G 11/00
                                                        348/563
5,801,753 A   9/1998 Eyer
(Continued)

FOREIGN PATENT DOCUMENTS

CN    102087583 A    6/2011
CN    102413373 A    4/2012
(Continued)

OTHER PUBLICATIONS

JP2009278335 A, Translated "Data Broadcast Reception Device and Data Broadcast Reception Method" Nov. 26, 2009.
(Continued)

*Primary Examiner* — Jason Salce
(74) *Attorney, Agent, or Firm* — Klintworth & Rozenblat IP LLP (57) ABSTRACT A first interface of a device receives content from a further device, at least one hardware processor analyses the content to find active elements that will be visible on a screen when displayed, generates a page by overlaying a first part of the content that will be visible on the screen when displayed with graphic elements respectively corresponding to found active elements, sends the page to a third interface for display on the screen and activates a corresponding active element upon reception, via a second interface from a user input device, of a command comprising an identifier displayed in a graphic element. In case the identifier corresponds to a graphic element associated with a group comprising a plurality of active elements, graphic elements corresponding to each active element in the group are overlaid over the first image.

18 Claims, 4 Drawing Sheets (51) Int. Cl.

| | |
|---|---|
| *G06F 3/0482* | (2013.01) |
| *G06F 3/0483* | (2013.01) |
| *G06F 16/954* | (2019.01) |
| *G06F 16/955* | (2019.01) |
| *H04N 21/422* | (2011.01) |
| *H04N 21/431* | (2011.01) |
| *H04N 21/435* | (2011.01) |
| *H04N 21/462* | (2011.01) |
| *H04N 21/472* | (2011.01) |
| *H04N 21/478* | (2011.01) |
| *H04N 21/4782* | (2011.01) |

(52) U.S. Cl.
CPC .......... *G06F 3/0483* (2013.01); *G06F 16/954* (2019.01); *G06F 16/955* (2019.01); *H04N 21/42204* (2013.01); *H04N 21/4312* (2013.01); *H04N 21/4355* (2013.01); *H04N 21/4622* (2013.01); *H04N 21/4782* (2013.01); *H04N 21/472* (2013.01); *H04N 21/478* (2013.01)

(58) Field of Classification Search
CPC ........... H04N 7/17318; H04N 21/4622; H04N 21/47202; H04N 21/4828
See application file for complete search history.

(56) References Cited

U.S. PATENT DOCUMENTS

| | | | | | |
|---|---|---|---|---|---|
| 5,844,620 | A | * | 12/1998 | Coleman | H04N 7/16 |
| | | | | | 725/54 |
| 7,245,291 | B2 | | 7/2007 | Sharif et al. | |
| 8,484,679 | B1 | * | 7/2013 | Chtchedrina | H04N 21/4821 |
| | | | | | 725/37 |
| 8,510,780 | B2 | * | 8/2013 | Stallings | H04N 5/4403 |
| | | | | | 725/39 |
| 2001/0052133 | A1 | * | 12/2001 | Pack | H04N 21/435 |
| | | | | | 725/109 |
| 2002/0010932 | A1 | * | 1/2002 | Nguyen | H04N 21/4782 |
| | | | | | 725/51 |
| 2002/0052746 | A1 | * | 5/2002 | Handelman | G10L 15/22 |
| | | | | | 704/E15.045 |
| 2002/0194194 | A1 | * | 12/2002 | Fenton | G06F 16/958 |
| 2003/0204846 | A1 | * | 10/2003 | Breen | H04N 5/44543 |
| | | | | | 725/39 |
| 2005/0068307 | A1 | | 3/2005 | Flora et al. | |
| 2006/0294454 | A1 | | 12/2006 | Matsuda | |
| 2011/0066983 | A1 | | 3/2011 | Kim | |
| 2012/0260160 | A1 | | 10/2012 | Kim | |
| 2012/0313849 | A1 | | 12/2012 | Bak | |
| 2016/0342388 | A1 | | 11/2016 | Imamura | |
| 2017/0214975 | A1 | * | 7/2017 | Schmidt | H04N 21/47217 |

FOREIGN PATENT DOCUMENTS

| | | |
|---|---|---|
| CN | 102754059 A | 10/2012 |
| CN | 102902728 A | 1/2013 |
| CN | 103561347 A | 2/2014 |
| CN | 106534732 A | 3/2017 |
| EP | 2533242 A1 | 12/2012 |
| JP | 2005010894 A | 1/2005 |
| JP | 2007004362 A | 1/2007 |
| JP | 2009278335 A | 11/2009 |
| JP | 4676173 B2 | 2/2011 |
| JP | 2016218868 A | 12/2016 |
| KR | 970013922 A | 3/1997 |
| KR | 20110029278 A | 3/2011 |
| KR | 20110138698 A | 12/2011 |
| KR | 20120135855 A | 12/2012 |
| WO | 03091906 A1 | 11/2003 |
| WO | 2012164672 A1 | 12/2012 |

OTHER PUBLICATIONS

KR20110138698 A, Translated "Method for Moving of Focus TV Browser IPTV" Dec. 28, 2011.

CN103561347 A, Translated "Shortcut menu generation method and device based on browser" Feb. 5, 2014.

* cited by examiner

DEVICE AND METHOD FOR NAVIGATION THROUGH ACTIVE ELEMENTS IN A DISPLAYED PAGE

REFERENCE TO RELATED EUROPEAN APPLICATION

This application claims priority to European Patent Application No. 18305378.4, entitled "DEVICE AND METHOD FOR NAVIGATION THROUGH ACTIVE ELEMENTS IN A DISPLAYED PAGE", filed on Mar. 30, 2018, the contents of which are hereby incorporated by reference in its entirety.

TECHNICAL FIELD

The present disclosure relates generally to navigation through displayed pages with active elements and in particular to such navigation using conventional remote controls.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Connected TVs allow access via a web browser to the same web sites as on a computer, smartphone or tablet. However, because of the dimensions of the TV screen, the distance between the user and the screen and, in particular, a limited user interface (typically a conventional remote control, but no touch screen or mouse and only rarely a keyboard), browsing of web pages on a TV is less intuitive than on a computer, smartphone or tablet.

Web pages can be adapted for viewing on a TV screen, for example using a dedicated user agent, larger fonts and rearrangement of items in the web page. Even so, navigation and selection of active elements on a web page remain problematic. An active element is an item with which a user can interact via an input user interface, such as hyperlinks, text input fields, buttons and clickable images.

A similar problem applies to set-top boxes and decoders that enable a user to interact with a head-end to for instance request a Video-on-Demand (VoD) and that provide a user interface with which the user interacts via a conventional remote control.

Figure 1:
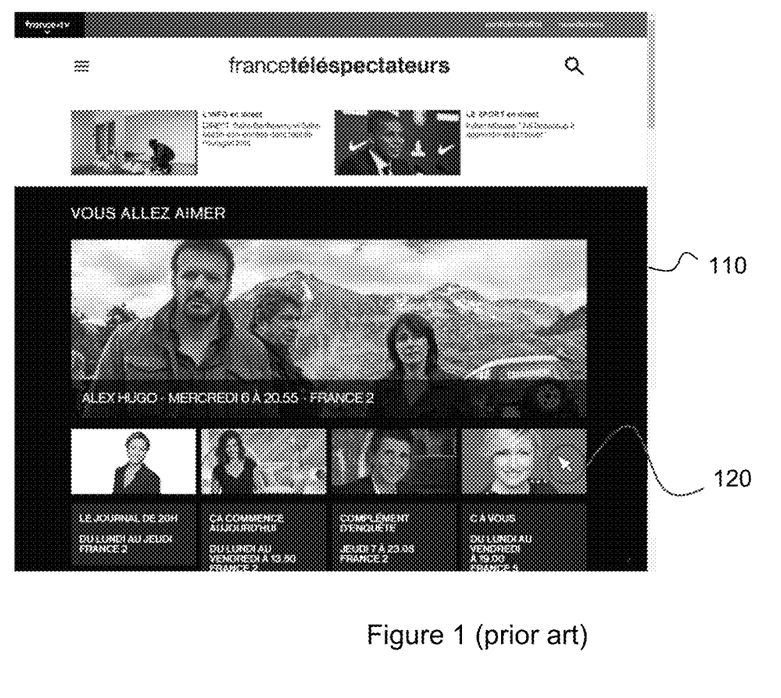
FIG. 1 illustrates a conventional solution for web page navigation.

The most common conventional solution is a remote control with arrows keys that are used to move a cursor or other indicator to a desired active element and then to validate by pressing an "OK" or Enter key or the like. FIG. 1 shows an example screenshot of a web page 110 overlaid by a cursor 120 (encircled in red for increased visibility).

This cursor-based solution has a number of disadvantages. It can be slow to move the cursor to the desired active element as it will often be required to use the arrow buttons many times. Depending on the initial position of the cursor, it can be necessary to traverse the entire web page to arrive at the active element.

JP 2009-278335 A appears to describe a solution in which a head-end provides to a TV an image with a selection of available content, where the content is overlaid by a number. When a user inputs a number via a remote control, the corresponding content is provided by the head-end. The solution seems to work well as long as the head-end has control over the content and how it will be displayed, which clearly is not always the case, especially for web pages that are formatted for display by the receiving device or that have dynamic content, or both.

It will thus be appreciated that there is a desire for a solution that addresses at least some of the shortcomings of navigation between the different active elements displayed on for example a TV. The present principles provide such a solution.

SUMMARY OF DISCLOSURE

In a first aspect, the present principles are directed to a device including a first interface configured to receive data related to information to be displayed on a screen, a second interface configured to receive commands from a user input device, a third interface configured to output images for display on the screen, and at least one hardware processor configured to process the data to generate a first image comprising at least part of the information to be displayed, the first image being visible in its entirety on the screen when displayed, generate an overlaid first image by overlaying the first image with graphic elements respectively corresponding to active elements in the first image, provide the overlaid first image via the third interface for output on the screen, and upon reception, through the second interface, of a command, activate a corresponding active element in case the command comprises an identifier displayed in a graphic element. The at least one hardware processor is further configured to associate a single graphic element with a group comprising a plurality of active elements and to, upon reception via the second interface of an identifier corresponding to a group, overlay over the first image graphic elements corresponding to each active element in the group In a second aspect, the present principles are directed to a method at a device that receives data related to information to be displayed on a screen, processes the data to generate a first image including at least part of the information to be displayed, the first image being visible in its entirety on the screen when displayed, generates an overlaid first image by overlaying the first image with graphic elements respectively corresponding to active elements in the first image, provides the overlaid first image via a third interface for output on the screen, and activates a corresponding active element upon reception, via a second interface from a user input device, of a command including an identifier displayed in a graphic element. In case the identifier corresponds to a graphic element associated with a group comprising a plurality of active elements, the activating comprises overlaying over the first image graphic elements corresponding to each active element in the group In a third aspect, the present principles are directed to a computer program product which is stored on a non-transitory computer readable medium and includes program code instructions executable by a processor for implementing the steps of a method according to any embodiment of the second aspect.

BRIEF DESCRIPTION OF DRAWINGS

Features of the present principles will now be described, by way of non-limiting example, with reference to the accompanying drawings, in which.

DESCRIPTION OF EMBODIMENTS

Figure 2:
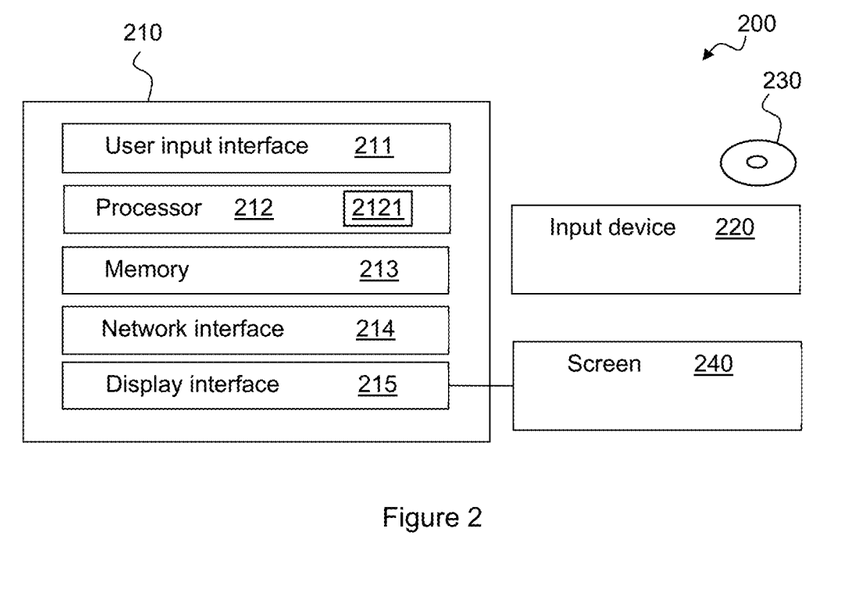
FIG. 2 illustrates a system according to an embodiment of the present principles.

FIG. 2 illustrates a system 200 according to an embodiment of the present principles. The system 200 includes a device 210 and an input device 220; also illustrated is a non-transitory computer-readable medium 230 that stores program code instructions that, when executed by a processor, implement the steps of a method according to the present principles.

The device 210 can for example be a TV or a set-top box. The device 210 includes a user input interface 211, at least one hardware processor ("processor") 212, memory 213, a network interface 214 and a display interface 215. The interfaces are at least partly implemented in hardware. It will be appreciated that parts of the device 210 that are not useful for understanding the present principles are not illustrated for the sake of brevity of description.

The user input interface 211 is typically wireless and configured to receive input from the input device 220 and to provide received input to the processor 212. The processor 212 is configured to execute the program code instructions to perform the method according to the present principles described with reference to FIG. 3. The memory 213 is configured to store the program code instructions for execution by the processor 212 and to store data. The network interface 214 can be wired or wireless and is configured to allow communication between the processor 212 and at least one device in an external network (not shown) to obtain content for display to a user. Such content may be web pages, which will be used as a non-limitative example. The display interface 215 can be wired or wireless and is configured to output content for display on a screen 240. In case the device 210 is a television, the screen 240 is included in the device, but this is not so in case the device 210 is a device such as a set-top box that provides information for display on a separate screen. It will be noted that a television may also have a display interface for displaying information on a separate screen (not shown).

The remote control 220 can be a conventional remote control with buttons for arrows (up-down-left-right), OK, power on and off, volume control and digits 0-9 for inputting channel numbers.

Figure 3:
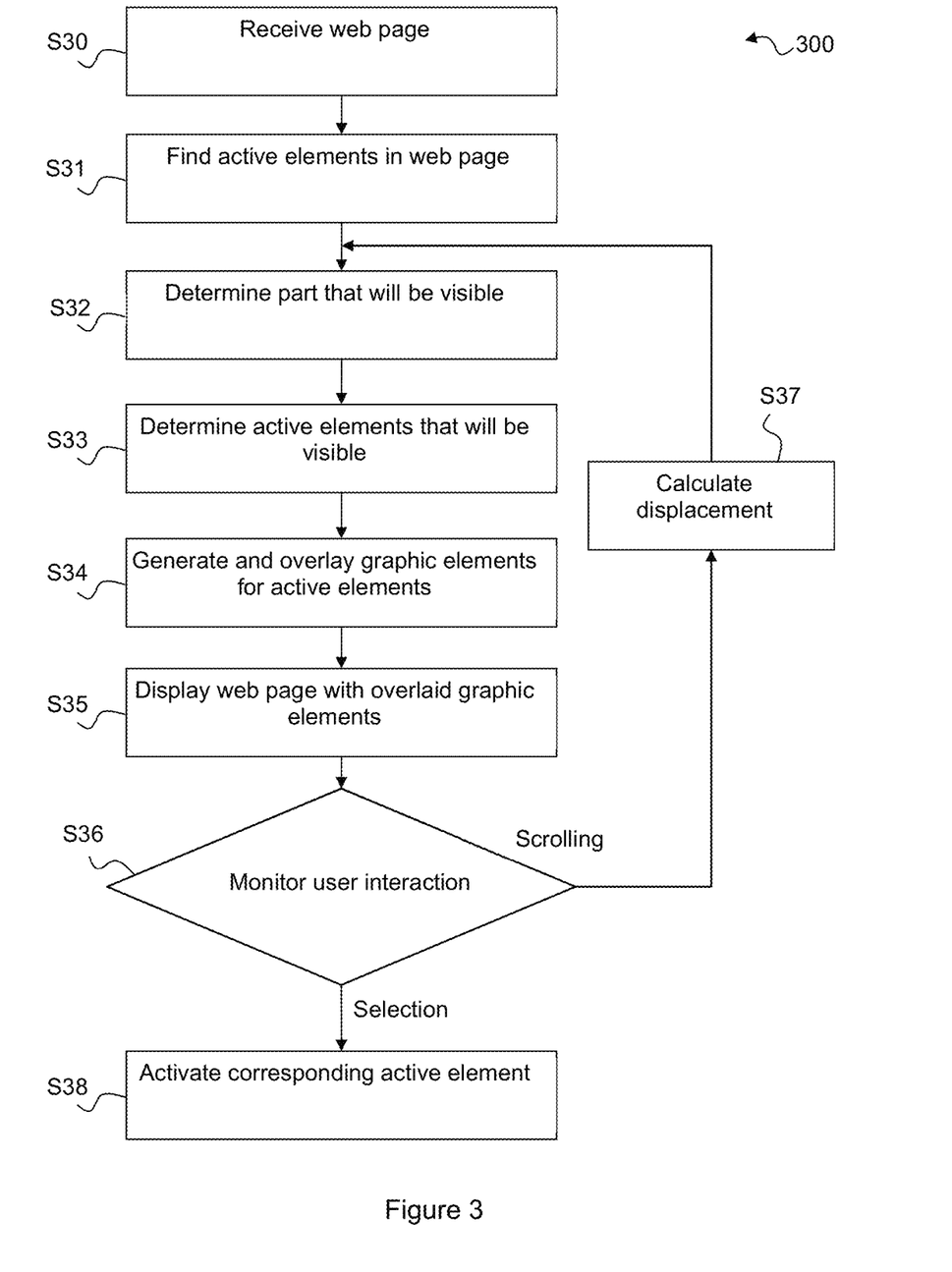
FIG. 3 illustrates a web browser method according to the present principles.

The processor 212 implements a web browser 2121 according to the present principles. To this end, the web browser 2121 can be a conventional web browser such as Google Chrome or Mozilla Firefox extended by plug-in or add-on that provides added functionality of the present principles. The web browser and the plug-in (add-on) can be implemented by the program code instructions FIG. 3 illustrates a web browser method 300 according to the present principles. In the following, it will be understood that the web browser 2121 is executed by the processor 212.

The web browser 2121 receives, in step S30, through the network interface 214 web page data for display and analyses, in step S31, the web page data to find active elements (such as hyperlinks) therein. The web page can be stored in the memory 213. The web page can be in a markup language such as HTML and XML or in a scripting language designed for web development like javacsript.

In step S32, the web browser 2121 formats the web page data for display on the screen 240 and determines the part of the web page that will be visible when displayed to a user when displayed on the screen 240. This depends on the sizes of the web page (in the size that will be used to display it) and of the screen 240. This may be based on techniques like the formatting of HTML pages that adapt to the size of the display window, determination of the size of the displayed part for use with scroll bars or print previews that show what will be printed on a page, as is well known in the art. It will be appreciated that the formatting is not necessary in case the web page is preformatted, e.g. by a head-end device.

In step S33, the web browser 2121 determines the active elements in the part that will be displayed and the location of these active elements. The web browser knows the part of the document that will be visible and also knows, through the formatting of the web page, what active elements are located where. These active elements and their location can be stored in the memory 213.

In step S34, the web browser 2121 generates and overlays graphic elements on the web page in the vicinity of at least some of the active elements that will be visible to the user. Each graphic element is associated with the corresponding active element and preferably displays a different active element identifier. Such an identifier will be readily visible to the user and preferably corresponds to something that the user can input easily using the input device 220, for example numbers (such as on a conventional remote control) or letters. Each identifier can be stored with its respective active element (and the location) in the memory 213.

In this context, in the vicinity is intended to mean close enough to an active element to reasonably ensure that a user realizes to which active element the graphic element is linked (i.e. associated), without hiding the active element and thus making it difficult or impossible to see what the active element is about, preferably by having the graphic element closer to its associated active element than to other active elements. The graphic element can obscure part of the active element as long as the active element can be easily identified. The graphic element can be opaque or semi-transparent. A graphic element can also include a border surrounding its active element. Examples of graphic elements in the vicinity of active elements are shown in FIGS. 4-7.

In one embodiment, only identifiers directly corresponding to buttons on the input device 220 are used. For example, if the input device 220 includes numeric buttons 0-9, then the identifiers can be limited to one-digit numbers (including zero). In this embodiment, it is possible that there are not enough graphic elements for all the visible active elements. For this reason, a specific user input, e.g. '0', can cause the processor 212 to associate these graphic elements with further active elements instead of the original active elements.

In a further embodiment, identifiers can also correspond to a combination of buttons, such as multiple-digit numbers. In yet a further embodiment, identifiers corresponding to non-digit buttons, such as coloured buttons, may be used, possibly in addition to other buttons or combinations of buttons.

As will be illustrated in further detail, a graphic element can be associated with a plurality of active elements. In this case, it is preferable that the graphic element includes an indicator of this. For example, such a graphic element can include an identifier together with a special symbol, like '+', be of a specific colour different from 'single' graphical elements, have a specific border, or the like.

In step S35, the web browser 2121 displays the visible part of the web page with overlaid graphical elements via the display interface 215.

In step S36, the web browser 2121 monitors user interactions with the displayed web page through the user input interface 211. Such interactions include displacement (scrolling) of the web page and input of an identifier.

In case the user interaction is scrolling of the web page, the displacement is calculated in step S37 and the method returns to step S32 where the part that will be visible is determined.

In case the user interaction is a selection of an identifier—which can be input like a channel number in conventional systems—in step S38, the web browser 2121 determines the corresponding active element and activates the active element. The activation can be different for different types of active elements, such as for example:
- for a hyperlink, the activation of the hyperlink;
- for a text field, positioning of a cursor in the text field and the display of a virtual keyboard to permit inputting text;
- for a button, performing the function associated with the button;
- for a pop-up list, displaying the items in the list; and
- for a graphical element associated with a plurality of active elements, presentation of further graphical elements; see further description hereinafter.

The selection can also cause movement of the graphic elements, as already described, or the display of graphic elements for active elements of a group, as will be further described.

In an embodiment, the user can activate and disactivate the display of the graphic elements overlaid on the web page.

Figure 4:
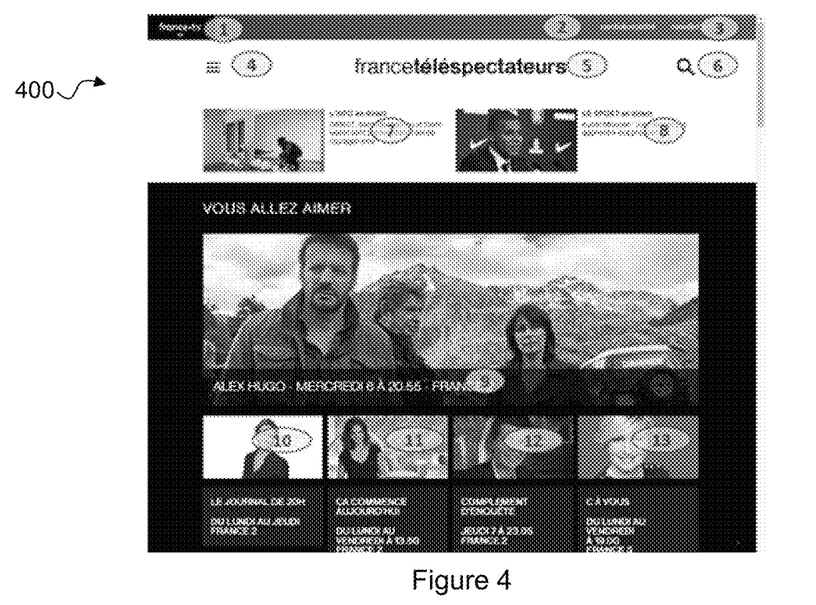
FIG. 4 illustrates a first example of a web page displayed according to the present principles.

FIG. 4 shows an example screenshot of a web page 400 overlaid by graphic elements. As can be seen, 13 graphical elements, 1-13, are overlaid in the vicinity of various active elements in the web page.

It has already been mentioned that a graphical element can be associated with a plurality of active elements. This can for example happen when there are a plurality of active elements in a relatively small area, making it difficult for a user to determine which graphic element corresponds to which active element. It can also be difficult to display the graphic elements clearly. It can also happen that the web page includes many active elements and that it is desirable for the user to first select a group of active elements and then select the desired active element in the group.

Figure 5:
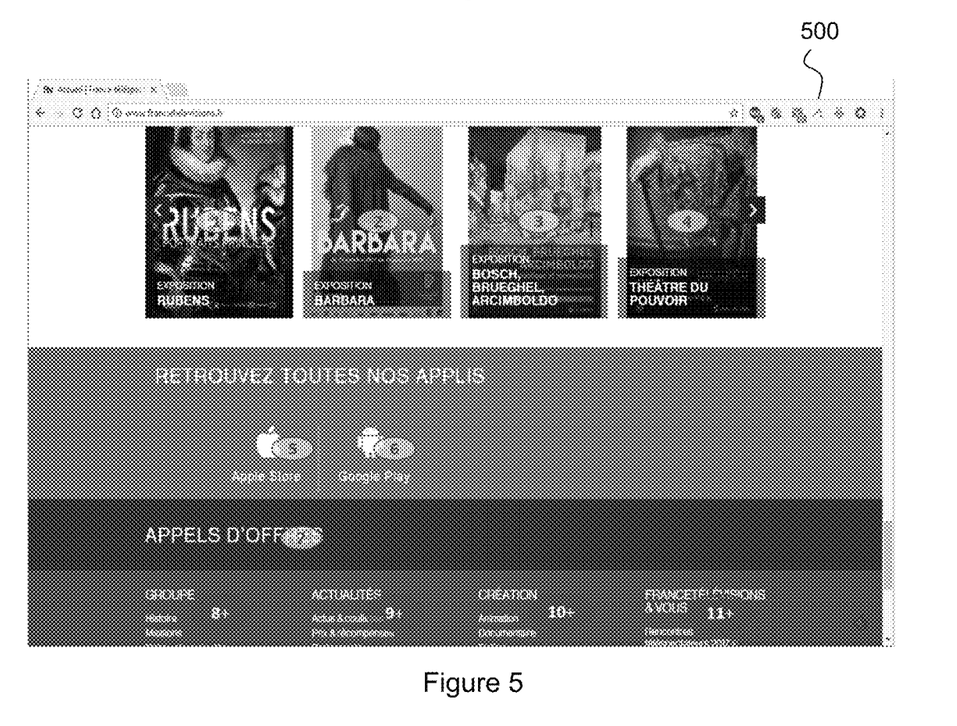
FIG. 5 illustrates a second example of a web page displayed according to the present principles.

FIG. 5 illustrates a second example of a web page 500 displayed according to the present principles. As can be seen, graphic elements labelled 1 through 7 are each associated with a single active element, "Rubens," "Barbara," ... "Appels d'offres". At the bottom of the visible part of the web page can be seen four groups of active elements, these groups being named "Groupe," "Actualités," "Creation" and "France Television & Vous". Each group is associated with a respective graphic element that indicates that selection of the corresponding identifier will make it possible to select an individual active element of the group.

For example, "Groupe" is associated with graphic element "8+" where '8' is the identifier and '+' is the indicator, as already mentioned.

Selection of a "group" identifier will cause the web browser 2121 to display graphic elements corresponding to the active elements of the selected group. This may be done in at least two ways, respectively illustrated in FIG. 6 and FIG. 7.

Figure 6:
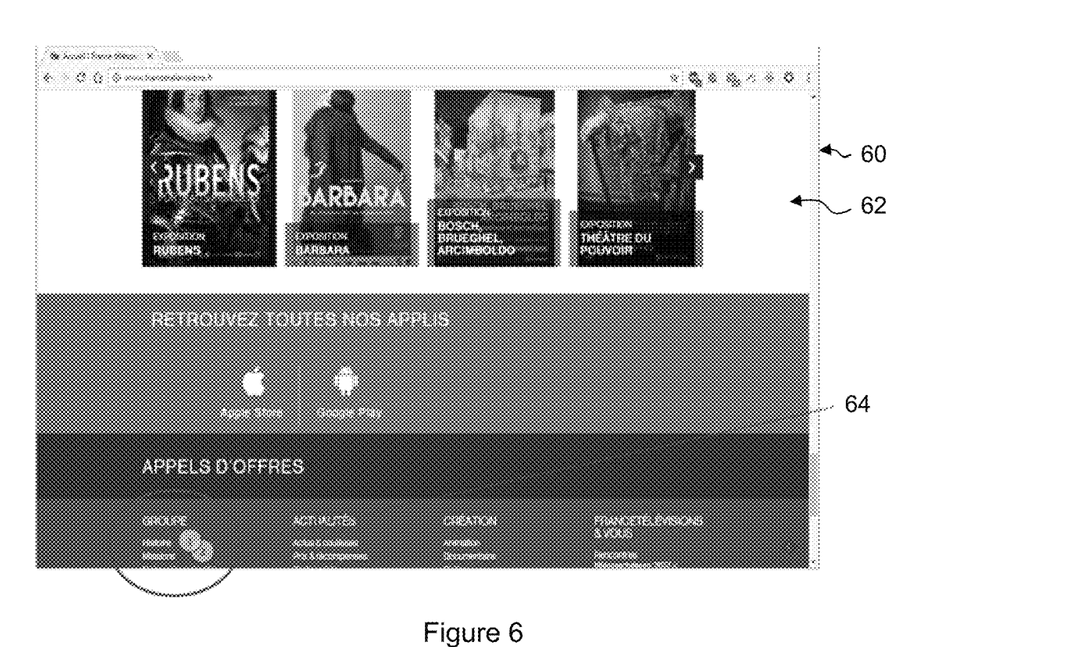
FIG. 6 illustrates a first example of a group selection in a web page displayed according to the present principles.

FIG. 6 illustrates a first example of a group selection in a web page displayed according to the present principles. FIG. 6 shows a web browser 60 displaying a web page 62 that corresponds to the web page 500 illustrated in FIG. 5; unless scrolled, the web pages 62, 500 will generally be identical. However, the overlaid graphic elements have changed. In FIG. 6, each active element of the selected group is now individually associated with a graphic element jointly indicated as 74. Selection of such a graphic element will now activate the corresponding active element. In the example, the identifiers again start at one and is then incremented. In FIG. 6, once the group has been selected, the graphic elements associated with other groups disappear and their association can be made non-existent. For example, in FIG. 5, "Rubens" was associated with identifier '1', but this is not the case in FIG. 6; '1' is now associated with "Histoire" in the group named "Groupe".

Figure 7:
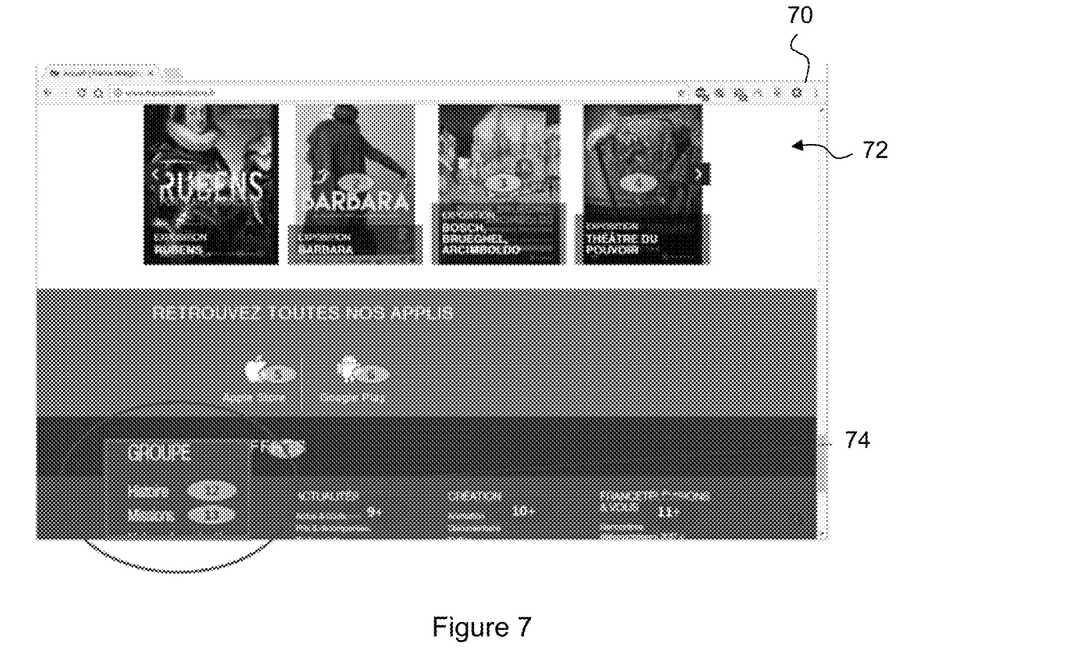
FIG. 7 illustrates a second example of a group selection in a web page displayed according to the present principles.

FIG. 7 illustrates a second example of a group selection in a web page displayed according to the present principles. FIG. 7 shows a web browser 70 displaying a web page 72 that corresponds to the web page 500 illustrated in FIG. 5; unless scrolled, the web pages 72, 500 will generally be identical. However, the overlaid graphic elements have changed by substitution of group graphic element "8+" by individual graphic elements with numbers not previously used in FIG. 7, in this case '12' and '13'. It is noted that the web browser 70 can be arranged to undo the group selection by inputting the identifier that was used to select the group in the first place, i.e. '8'.

One skilled in the art will appreciate that while the present principles have been described with reference to web pages, they can also be used for other kinds of "pages" such as pre-formatted pages with active elements from for example service providers such as video content providers for example via decoders or set-top boxes provided that the active elements in such pages can be determined. In this case, the pages can be for example be received as MPEG packets.

It will thus be appreciated that the present principles can provide improved navigation through active elements when using a conventional remote control.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A device comprising:
a first interface configured to receive data related to information to be displayed on a screen;
a second interface configured to receive user input from a user input device;
a third interface configured to output images for display on the screen; and
at least one processor configured to:
process the data to generate a first image comprising at least part of the information to be displayed, the first image being visible in its entirety on the screen when displayed,
wherein the first image comprises at least a part of a webpage, and
wherein a plurality of first active elements of the first image are visibly displayed within the first image;
generate an overlaid image by overlaying the first image (i) with first graphic elements, wherein each of the first graphic elements corresponds to a different one of the plurality of first active elements visible in the first image, wherein each of the first graphic elements includes a first identifier different for each of the first graphic elements, wherein each of the first graphic elements is displayed on or in a vicinity of a corresponding first active element, and (ii) with a second graphic element including a second identifier different from the first identifiers, and wherein the second identifier corresponds to a group of second active elements visible in the first image and different from the plurality of first active elements;
provide the overlaid image via the third interface for output on the screen;
upon receiving, through the second interface, user input comprising one of the first identifiers, activate one of the plurality of first active elements corresponding to the one of the first identifiers;
upon receiving, through the second interface, user input comprising the second identifier, overlay over the first image third graphic elements, wherein each of the third graphic elements includes a third identifier different from the first identifiers and corresponds to a different one of the group of second active elements, and
upon receiving, through the second interface, an instruction to display a further part of the webpage on the screen:
generate a second image comprising the further part of the webpage, the second image being visible in its entirety on the screen when displayed;
generate an overlaid second image by overlaying the second image with fourth graphic elements, each fourth graphic element respectively corresponding to different active elements in the second image; and
provide the overlaid second page to the third interface for output.

2. The device of claim 1, wherein the at least one processor is further configured to overlay the third graphic elements in addition to the first graphic elements, and instead of the second graphic element.

3. The device of claim 1, wherein the at least one processor is further configured to overlay the third graphic elements instead of the first graphic elements and the second graphic element.

4. The device of claim 1, further comprising the screen.

5. The device of claim 1, wherein the device is a set-top box or a decoder.

6. The device of claim 1, wherein the user input comprises one or more digits.

7. The device of claim 1, wherein activation of an active element comprises one of:
for a hyperlink, the activation of the hyperlink; and
for a text field, positioning of a cursor in the text field and the display of a virtual keyboard to permit inputting text.

8. The device of claim 1, wherein each of the first identifiers, the second identifier, and the third identifiers identify a value for selection of one active element visible in the first image.

9. The device of claim 1, wherein each of the first graphic elements has a one-to-one correspondence with one of the plurality of first active elements.

10. A method comprising at a device:
receiving, by a first interface from a further device, data related to information to be displayed on a screen;
processing the data to generate a first image comprising at least part of the information to be displayed, the first image being visible in its entirety on the screen when displayed,
wherein the first image comprises at least a part of a webpage, and
wherein a plurality of first active elements of the first image are visibly displayed within the first image;
generating, by at least one processor, an overlaid image by overlaying the first image (i) with first graphic elements, wherein each of the first graphic elements corresponds to a different one of the plurality of first active elements visible in the first image, wherein each of the first graphic elements includes a first identifier different for each of the first graphic elements, wherein each of the first graphic elements is displayed on or in a vicinity of a corresponding first active element, and (ii) with a second graphic element including a second identifier different from the first identifiers, and wherein the second identifier corresponds to a group of second active elements visible in the first image and different from the plurality of first active elements;
providing, by the at least one processor, the overlaid image via a third interface for output on the screen;
upon receiving, via a second interface from a user input device, user input comprising one of the first identifiers, activating, by the at least one processor, one of the plurality of first active elements corresponding to the one of the first identifiers; and
upon receiving, through the second interface, user input comprising the second identifier, overlaying over the first image third graphic elements,
wherein each of the third graphic elements includes a third identifier different from the first identifiers and corresponds to a different one of the group of second active elements, and
upon receiving, through the second interface, an instruction to displace the webpage to display a further part of the webpage on the screen:
  generating, by the at least one processor, a second image comprising the further part of the webpage, the second image being visible in its entirety on the screen when displayed;
  generating, by the at least one processor, an overlaid second image by overlaying the second image with fourth graphic elements, each fourth graphic element respectively corresponding to different active elements in the second image; and
  providing, by the at least one processor, the second page to the third interface for output on the screen.

11. The method of claim 10, wherein the third graphic elements are overlaid in addition to the first graphic elements, and instead of the second graphic element.

12. The method of claim 10, wherein the third graphic elements are overlaid instead of the first graphic elements and the second graphic element.

13. The method of claim 10, wherein the user input comprises one or more digits.

14. The method of claim 10, wherein activation of an active element comprises one of:
for a hyperlink, the activation of the hyperlink; and
for a text field, positioning of a cursor in the text field and the display of a virtual keyboard to permit inputting text.

15. The method of claim 10, wherein the first image is configured to be displayed on a television screen.

16. The method of claim 10, wherein the first identifiers, the second identifier, and the third identifiers include characters selectable on the user input device.

17. The method of claim 10, wherein each of the first graphic elements has a one-to-one correspondence with one of the plurality of first active elements.

18. A non-transitory computer-readable storage medium having stored instructions that are operative, when executed by a processor, to cause the processor to:
receive, by a first interface from a further device, data related to information to be displayed on a screen;
process the data to generate a first image comprising at least part of the information to be displayed, the first image being visible in its entirety on the screen when displayed,
wherein the first image comprises at least a part of a webpage, and
wherein a plurality of first active elements of the first image are visibly displayed within the first image;
generate, by at least one processor, an overlaid image by overlaying the first image (i) with first graphic elements,
wherein each of the first graphic elements corresponds to a different one of the plurality of first active elements visible in the first image,
wherein each of the first graphic elements includes a first identifier different for each of the first graphic elements,
wherein each of the first graphic elements is displayed on or in a vicinity of a corresponding first active element, and (ii) with a second graphic element including a second identifier different from the first identifiers, and
wherein the second identifier corresponds to a group of second active elements visible in the first image and different from the plurality of first active elements;
provide, by the at least one processor, the overlaid image via a third interface for output on the screen;
upon receiving, via a second interface from a user input device, user input comprising one of the first identifiers, activate, by the at least one processor, one of the plurality of first active elements corresponding to the one of the first identifiers;
upon receiving, through the second interface, user input comprising the second identifier, overlay over the first image third graphic elements,
wherein each of the third graphic elements includes a third identifier different from the first identifiers and corresponds to a different one of the group of second active elements, and
upon receiving, through the second interface, an instruction to display a further part of the webpage on the screen:
  generate a second image comprising the further part of the webpage, the second image being visible in its entirety on the screen when displayed;
  generate an overlaid second image by overlaying the second image with fourth graphic elements, each fourth graphic element respectively corresponding to different active elements in the second image; and
  provide the overlaid second page to the third interface for output.

* * * * *